H. W. KEMBLE.
HEN'S NEST DEVICE.
APPLICATION FILED SEPT. 15, 1915.
1,175,638. Patented Mar. 14, 1916.
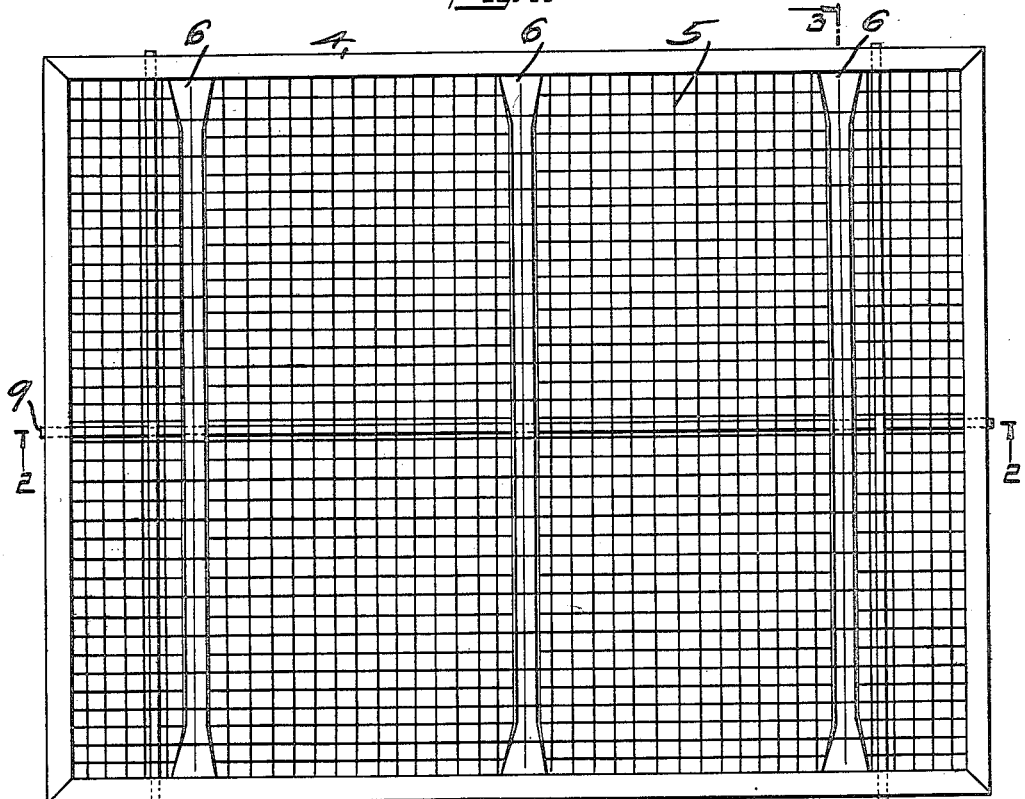
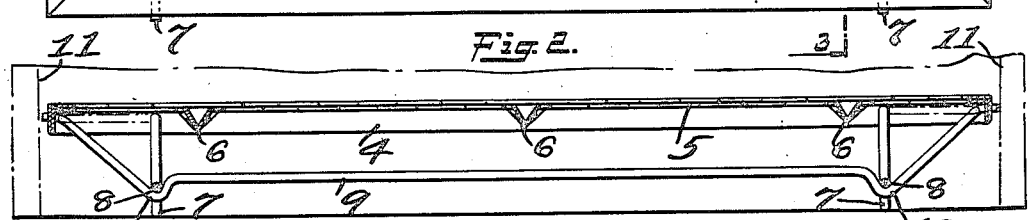
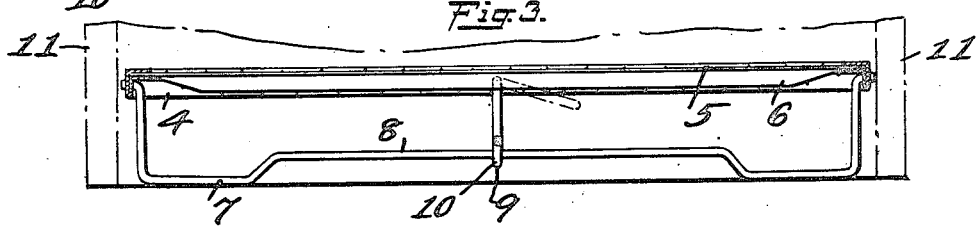
WITNESSES
George L. Blume.
J. C. Larsen
INVENTOR
Harry W. Kemble
BY Munn & Co.
ATTORNEYS

UNITED STATES PATENT OFFICE.

HARRY WALTER KEMBLE, OF SETAUKET, NEW YORK.

HEN'S-NEST DEVICE.

1,175,638.  Specification of Letters Patent.  Patented Mar. 14, 1916.

Application filed September 15, 1915. Serial No. 50,764.

*To all whom it may concern:*

Be it known that I, HARRY W. KEMBLE, a citizen of the United States, and a resident of Setauket, in the county of Suffolk and State of New York, have invented certain new and useful Improvements in Hen's-Nest Devices, of which the following is a specification.

My invention relates to means for breaking up sitting hens, and the main object thereof is to provide means within a nest which will prevent a hen from generating the heat required for sitting and thus causes her to give up her desire to sit.

My invention is fully described in the following specification, of which the accompanying drawings form a part, in which like characters refer to like parts in each of the views, and in which:—

Figure 1 is a plan view of my invention; Fig. 2 is a section taken on the line 2—2 of Fig. 1 showing the frame of a nest in dotted lines; and Fig. 3 is a section taken on the line 3—3 of Fig. 1 also showing said frame in dotted lines.

In the drawings forming a part of this application I have shown a frame 4 for a screen 5 braced by means of brace members 6 shown as of angle bars flattened at the ends but which may be of any desired form, and the frame 4 is also formed of angle bars as shown in Figs. 2 and 3.

Pivotally connected with the frame 4 adjacent each end thereof is a leg member 7 made of wire bent upwardly at its center as shown at 8, Fig. 3, and pivoted to the ends of the frame 4 and centrally thereof is a wire leg brace member 9 bent downwardly beneath each leg at the portion 8 thereof, and thence upwardly to provide a loop 10 in which the portion 8 of the respective leg 7 rests when the device is in use. The brace member 9 is of spring metal in order that the leg members 7 may be sprung out of the respective loops 10 and folded flat against the under side of the screen 5, after which the brace member 9 may be folded against the said leg members, thus requiring very little room for storage of a number of the devices.

In practice, one, or more, of the devices is placed in a nest indicated by broken lines at 11 and filling the same in a horizontal plane, or approximately so, and the platform so formed becomes the bottom of the nest. Inasmuch as this platform is raised from the ground it is impossible for the hen to generate the necessary amount of heat for sitting, and she then abandons all desire to sit and resumes laying.

My invention is very simple in construction and use, and, while I have shown a present desired form of construction, it will be obvious that I do not desire to be limited thereto, as many other forms could be designed which embodied the principle, and I reserve the right to make all desired changes over the form shown as properly come within the spirit of the invention and the scope of the following claim.

Having fully described my invention, what I claim as new, and desire to secure by Letters Patent, is:—

A device of the class described, comprising a frame, a screen therein, foldable legs, beneath said frame, and a foldable brace member for said legs, said device being placed within a nest to raise a hen from the bottom of the nest and thus prevent the generation of sufficient heat by the hen for sitting.

In testimony whereof I have signed my name to this specification in the presence of two subscribing witnesses.

HARRY WALTER KEMBLE.

Witnesses:
PAUL E. SCHAEFER,
H. L. BROWN.